United States Patent
Park et al.

(10) Patent No.: US 9,580,361 B2
(45) Date of Patent: Feb. 28, 2017

(54) PREPARATION METHOD OF TUNGSTEN CARBIDE SINTERED BODY FOR FRICTION STIR WELDING TOOL

(75) Inventors: Hyun Kuk Park, Iksan-si (KR); Ik Hyun Oh, Gwangju (KR); Hee Jun Yoon, Buan-gun (KR); Hyeon Taek Son, Gwangju (KR); Kwang Jin Lee, Jeonju-si (KR); Hee Seon Bang, Gwangju (KR); Han Sur Bang, Gwangju (KR)

(73) Assignee: KOREA INSTITUTE OF INDUSTRIAL TECHNOLOGY, Cheonansi (KR)

( * ) Notice: Subject to any disclaimer, the term of this patent is extended or adjusted under 35 U.S.C. 154(b) by 425 days.

(21) Appl. No.: 14/233,424

(22) PCT Filed: Dec. 9, 2011

(86) PCT No.: PCT/KR2011/009519
§ 371 (c)(1),
(2), (4) Date: Jan. 17, 2014

(87) PCT Pub. No.: WO2013/018957
PCT Pub. Date: Feb. 7, 2013

(65) Prior Publication Data
US 2014/0191443 A1 Jul. 10, 2014

(30) Foreign Application Priority Data

Aug. 3, 2011 (KR) .................. 10-2011-0077366

(51) Int. Cl.
*C04B 35/64* (2006.01)
*B22F 3/105* (2006.01)
(Continued)

(52) U.S. Cl.
CPC .............. *C04B 35/64* (2013.01); *B22F 3/105* (2013.01); *B23K 20/1245* (2013.01);
(Continued)

(58) Field of Classification Search
CPC ... C04B 35/64; C04B 35/5626; C04B 35/645; C04B 2235/666; C04B 2235/96;
(Continued)

(56) References Cited

U.S. PATENT DOCUMENTS 5,989,487 A * 11/1999 Yoo .................. B22F 3/093
266/249
2010/0139840 A1* 6/2010 Allemand ........... C04B 35/5611
156/89.11

FOREIGN PATENT DOCUMENTS

IT   WO 2010070623 A2 * 6/2010 ............... B22F 3/14
KR   10-1997-0017739       4/1997
(Continued)

OTHER PUBLICATIONS

NPL-1. Huang et al. Bulk ultrafine binderless WC prepared by spark plasma sintering. Nov. 2, 2005. Scripta Materialia 54 (2006) 441-445.*
(Continued)

*Primary Examiner* — Matthew Daniels
*Assistant Examiner* — Leith S Shafi
(74) *Attorney, Agent, or Firm* — Lex IP Meister, PLLC

(57) ABSTRACT

The present invention relates to a preparation method of a tungsten carbide sintered body for a friction stir welding tool used in a friction stir welding tool of a high melting point material such as steel, titanium and the like or a dissimilar material such as aluminum, magnesium-steel, titanium and the like. The preparation method comprises the following steps: filling a tungsten carbide (WC) powder in a mold made of a graphite material; mounting the mold filled with
(Continued)

tungsten carbide powder in a chamber of a discharge plasma sintering apparatus; making a vacuum inside of the chamber; molding the tungsten carbide powder while maintaining a constant pressure inside the mold and increasing the temperature according to a set heat increase pattern until the temperature reaches a final target temperature; and cooling the inside of the chamber while maintaining the pressure pressurized in the mold after the molding step.

4 Claims, 5 Drawing Sheets

(51) Int. Cl.
 *C04B 35/56* (2006.01)
 *C04B 35/645* (2006.01)
 *B23K 20/12* (2006.01)
 *C22C 29/08* (2006.01)

(52) U.S. Cl.
 CPC ........ *C04B 35/5626* (2013.01); *C04B 35/645* (2013.01); *C22C 29/08* (2013.01); *C04B 2235/6562* (2013.01); *C04B 2235/6581* (2013.01); *C04B 2235/666* (2013.01); *C04B 2235/77* (2013.01); *C04B 2235/96* (2013.01)

(58) Field of Classification Search
 CPC ........ C04B 2235/6562; C04B 2235/77; C22C 29/08; B23K 20/1245; B22F 3/105; B22F 5/009
 USPC .... 264/434, 430, 603, 653, 666; 419/48, 49, 419/53, 60, 50, 51, 18
 See application file for complete search history.

(56) References Cited

FOREIGN PATENT DOCUMENTS

| KR | 10-2005-0081149 | 8/2005 |
|---|---|---|
| KR | 10-2008-0102786 | 11/2008 |
| KR | 10-2009-0041148 | 4/2009 |

OTHER PUBLICATIONS

NPL-2. Zhao et al. Sparking plasma sintering of nanometric tungsten carbide. 2009. Int. Journal of Refractory Metals & Hard Materials 27 (2009) 130-139.*
NPL-3. Mondal et al. Effect of heating mode on sintering of tungsten. 2010. Int. Journal of Refractory Metals and Hard Materials 28 (2010) 597-600.*
Machine Translation of KR 10-2009-0041148.*

* cited by examiner

PREPARATION METHOD OF TUNGSTEN CARBIDE SINTERED BODY FOR FRICTION STIR WELDING TOOL

TECHNICAL FIELD

The present invention relates to a preparation method of a tungsten carbide sintered body for a friction stir welding tool, and more particularly, to a preparation method of a tungsten carbide sintered body for a friction stir welding tool, which can prepare a uniform sintered body having high density, and high strength, high toughness and high abrasion resistance, while having little difference between internal and external physical properties, within a short time by a single process through a discharge plasma sintering process.

BACKGROUND ART

From the point of view of energy saving and environmental protection, a lightweight technology for various transportation means, such as automobiles, aircrafts, railway vehicles and ships, has emerged. In a welding process of lightweight materials, a friction stir welding (FSW) technology which is a non-melting solid state welding technology is applied. Recently, the FSW technology spotlighted as a next generation technology is widely used in welding of similar and dissimilar materials of high melting point materials, such as titanium, steel, stainless and nickel alloys, as well as the lightweight materials, and also applied to various industrial fields.

In order to weld the high melting point materials, it is necessary to develop a tool material having a long lifespan, and thus various materials are developed and studied to satisfy high strength, high abrasion resistance, high toughness, uniformity of micro-structures and the like. For example, as this kind of material, there are PCBN prepared by MegaStir company located in U.S.A., and Ir—W, Ir—Re, Ir—Mo or the like prepared by Furuya company located in Japan. However, the tools prepared in U.S.A. and Japan have excellent strength and toughness, but have disadvantages of a high price and a short lifespan.

Tungsten carbide (WC) has a melting point of 2600° C., and a density of 15.7 g/cm$^3$, and cobalt (Co) has a melting point of 1459° C., and a density of 8.9 g/cm$^3$. WC—Co is called as cemented carbide, has advantages in ceramics and metals and thus is applicable for various purposes. Since the tungsten carbide has a high melting point, high strength and high abrasion resistance, it is used for various purposes, such as machining tools, abrasion resistive tools, cutting tools and molds, and when the Co is added, toughness is improved, and thus it is possible to prepare a material having high toughness.

Recently, a preparation method of the WC—Co which is spotlighted as a material for a solid state friction stir welding tool can be classified into a melting/casting method, and a powder metallurgy method. The melting/casting method is the most general methods of sintering and preparing the WC—Co, which have some advantages of facilitating mass production and reducing preparation costs, but also have some disadvantages of limiting control of fine particles and high density. Furthermore, the above methods require several post-treatment processes.

However, in case of using the powder metallurgy method, since it has advantages of uniform phase distribution, control of fine particles and facile preparation of a high melting point material, and also has an advantage which can prepares the WC—Co having the high toughness and high strength, it is widely used as a substitute process for the melting/casting method.

However, as conventional powder metallurgy methods, a hot isostatic processing (HIP) method and a hot pressing (HP) method which can obtain a sintered body having a relative high density by simultaneously applying temperature and pressure have been mainly used, but development of a new process technology is required due to deterioration of strength, toughness and abrasion resistance caused by a long molding process time and thus limitation of fine particle control, and a difference between internal and external physical properties and an expensive process cost caused by an external heating system.

To satisfy the requirement, the applicant has filed a patent application for a preparation method of a WC—Co sintered body, which can be used for the solid state friction stir welding tool, using a discharge plasma sintering process.

However, in the WC—Co sintered body, since it is necessary to add Co to WC, additional processes are required over multiple stages in the preparation method. When preparing the sintered body, a process cost is increased and hardness thereof is reduced due to the addition of the Co, and thus it is restricted to be used as the high melting point friction stir welding tool due to a short lifespan. Therefore, a new method which can prepare a sintered body for the solid state friction stir welding tool using only the WC without a sintering additive such as Co is required.

DISCLOSURE OF THE INVENTION

In order to overcome the above-mentioned shortcomings, the present invention provides a preparation method of a tungsten carbide sintered body for a friction stir welding tool, which can prepare a high melting point uniform sintered body having a homogeneous structure with high density, high strength, high toughness and high abrasion resistance within a short time by a single process using pulsed current activation through a discharge plasma sintering apparatus, while can control particle growth of the tungsten carbide sintered body for the solid state friction stir welding tool, and also which has a lower process cost, compared with the HP method or the HIP method, and has little difference between internal and external physical properties.

According to an aspect of the invention, there is provided a preparation method of a tungsten carbide sintered body for a friction stir welding tool, including filling tungsten carbide (WC) powder in a mold made of a graphite material; installing the mold filled with the WC powder in a chamber of a discharge plasma sintering apparatus; making a vacuum inside the chamber; molding the WC powder in the mold while maintaining a constant pressure inside the mold and increasing a temperature according to a set heating pattern until the temperature reaches a final target temperature; and cooling the inside of the chamber while maintaining the pressure applied in the mold after the molding.

The final target temperature of the molding may be 1410 to 2000° C.

The WC powder in the filling may have a particle size of 10 to 100 μm, and the preparation method may further include preliminarily pressurizing the WC powder at a pressure of 1400 to 1600 kgf and maintaining the pressure for 5 to 15 minutes, after the filling of the WC powder in the mold.

The molding may maintain the WC powder filled in the mold at a pressure of 30 to 100 MPa, and the molding may include primarily heating the WC powder in the mold to a first target temperature at a heating rate of 60 to 150° C./min; maintaining the first target temperature for 1 to 10 minutes; secondarily heating the WC powder in the mold to a second target temperature at a heating rate of 30 to 80° C./min; maintaining the second target temperature for 1 to 10 minutes; thirdly heating the WC powder in the mold to a third target temperature at a heating rate of 10 to 80° C./min; maintaining the third target temperature for 1 to 10 minutes; fourthly heating the WC powder in the mold to a fourth target temperature at a heating rate of 10 to 80° C./min; maintaining the fourth target temperature for 1 to 10 minutes; fifthly heating the WC powder in the mold to a fifth target temperature at a heating rate of 10 to 80° C./min; maintaining the fifth target temperature for 1 to 10 minutes; sixthly heating the WC powder in the mold to a sixth target temperature at a heating rate of 10 to 80° C./min; maintaining the sixth target temperature for 1 to 10 minutes; seventhly heating the WC powder in the mold to a seventh final target temperature at a heating rate of 10 to 80° C./min; and maintaining the seventh final target temperature for 1 to 10 minutes, and the first target temperature may be 550 to 650° C., the second target temperature may be 900 to 1005° C., the third target temperature may be 1010 to 1105° C., the fourth target temperature may be 1110 to 1205° C., the fifth target temperature may be 1210 to 1305° C., the sixth target temperature may be 1310 to 1405° C., and the seventh final target temperature may be 1410 to 2000° C.

The WC sintered body has a relative density of 99.5% or more.

According to the preparation method of the tungsten carbide sintered body for the friction stir welding tool of the present invention, it is possible to obtain a high relative density of 99.5% or higher, and also to prepare the uniform sintered body having a homogeneous structure with little particle growth, high toughness, high abrasion resistance and high strength within a short time by a single process by using pulsed current activation through a discharge plasma sintering apparatus, while having little difference between internal and external physical properties and a thick thickness and large surface area. In addition, since the sintered body is prepared with only the tungsten carbide single material, excluding a sintering additive such as cobalt, the preparation method is simplified, preparation costs are reduced, and toughness, abrasion resistance and strength thereof are superior compared with a sintered body containing cobalt as the sintering additive.

BRIEF DESCRIPTION OF THE DRAWINGS

The objects, features and advantages of the present invention will be more apparent from the following detailed description in conjunction with the accompanying drawings, in which.

BEST MODE FOR CARRYING OUT THE INVENTION

Hereinafter, embodiments of the present invention will be described in detail with reference to the accompanying drawings.

Figure 1:
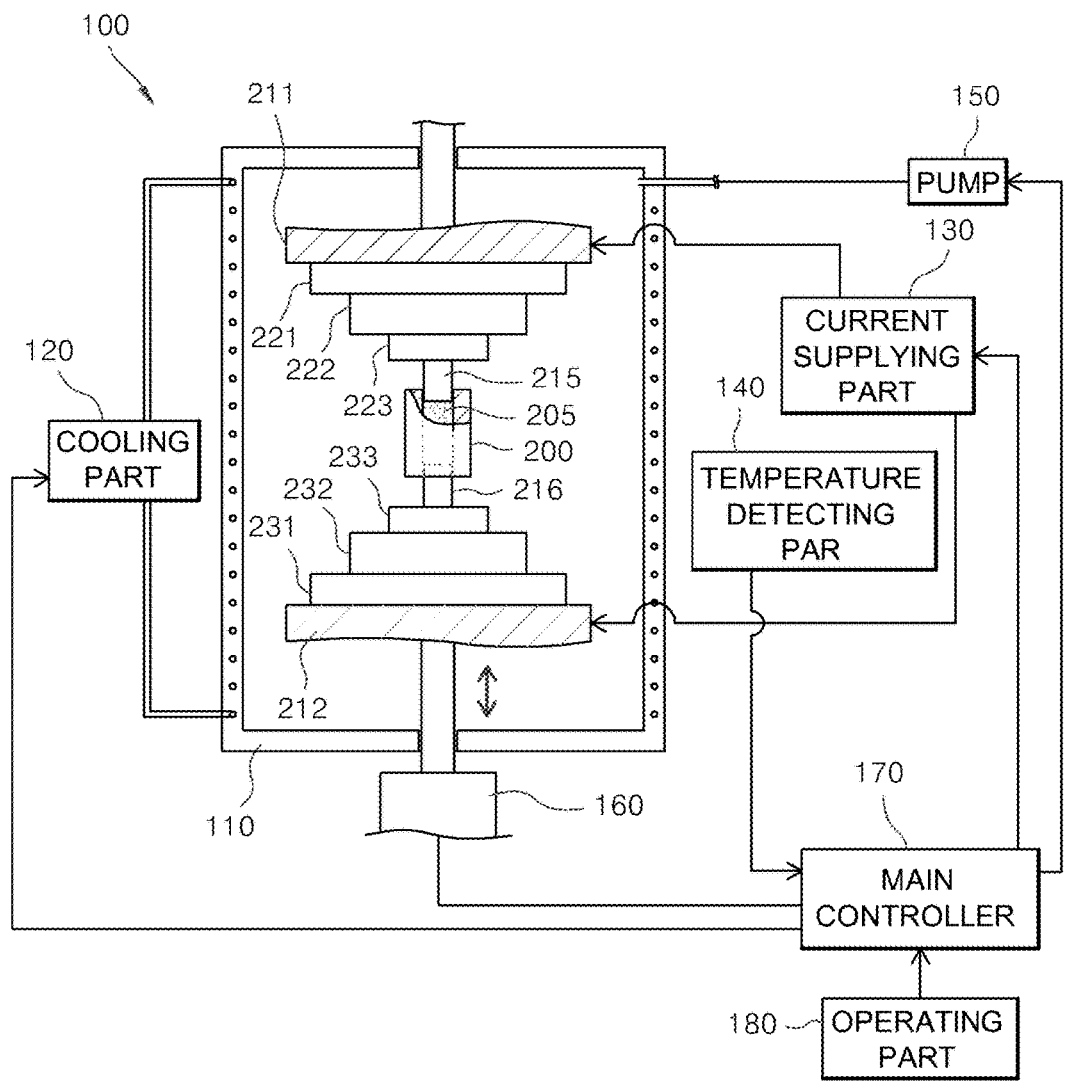
FIG. 1 is a view schematically illustrating a discharge plasma sintering apparatus used in a preparation method of a tungsten carbide sintered body for a friction stir welding tool in accordance with the present invention.

FIG. 1 is a view schematically illustrating a discharge plasma sintering apparatus used in a preparation method of a tungsten carbide sintered body for a friction stir welding tool in accordance with the present invention.

Referring to FIG. 1, a discharge plasma sintering apparatus 100 includes a chamber 110, a cooling part 120, a current supplying part 130, a temperature detecting part 140, a pump 150, a pressurizer 160, a main controller 170 and an operating part 180.

An upper electrode 211 and a lower electrode 212 are disposed in the chamber 110 so as to be spaced apart from each other. Although not illustrated, the upper electrode 211 and the lower electrode 212 are configured so that cooling water for heat emission can flow therethrough.

The cooling part 120 is configured so that the cooling water can flow through a cooling water flowing pipe provided in a wall of the chamber 110 and another cooling water flowing pipe provided in the upper electrode 211 and the lower electrode 212.

The current supplying part 130 is controlled by the main controller 170 so as to supply a pulsed current through the upper electrode 211 and the lower electrode 212.

The temperature detecting part 140 may be formed in an infrared temperature detecting manner which detects a temperature through a sight glass provided at the chamber 110.

The pump 150 is configured to discharge inner air in the chamber 110 to an outside.

The pressurizer 160 is installed to pressurize tungsten carbide powder 205 filled in a mold 200. In the drawing, the pressurizer 160 has a cylinder structure which can move up and down a lower portion of the lower electrode 212.

The main controller 170 controls the cooling part 120, the current supplying part 130, the pump 150 and the pressurizer 160 according to an operation command set through the operating part 180, and receives temperature information detected from the temperature detecting part 140 and then displays the temperature information through a displaying part (not shown).

The mold 200 is formed into a cylindrical shape having a receiving groove formed in a central portion thereof to receive the tungsten carbide powder.

The discharge plasma sintering apparatus 100 may have spacer between the mold 200 and the upper and lower electrodes 211 and 212, such that a current applied from the upper and lower electrodes 211 and 212 to the mold 200 can be concentrated, heating efficiency can be improved, and also unnecessary energy consumption can be reduced. That is, first to third upper spacers 221, 222 and 223 made of a graphite material, of which each diameter is gradually reduced toward an upper punch 215, are provided between the upper electrode 221 for applying an electric field into the mold 200 and the upper punch 215 entering into the mold 200 from an upper side of the mold 200. Further, first to third lower spacers 231, 232 and 233 made of a graphite material, of which each diameter is gradually reduced toward a lower punch 216, are provided between the lower electrode 221 and the lower punch 216 extended from the lower electrode 212 and entering into the mold 200 from a lower side of the mold 200.

According to such insertion structure of each of the upper and lower spacers 221, 222, 223, 231, 232 and 233, the current is concentrated from the upper and lower electrodes 211 and 212 to the mold 200 through the punches 215 and 216, and thus it is possible to increase the current utilization efficiency and the heating efficiency. The first upper spacer 221 and the first lower spacer 231 may have a diameter of 350 mm and a thickness of 30 mm, the second upper spacer 222 and the second lower spacer 232 may have a diameter of 300 mm and a thickness of 60 mm, and the third upper spacer 223 and the third lower spacer 233 may have a diameter of 100 to 200 mm and a thickness of 15 to 30 mm.

Hereinafter, processes of preparing a tungsten carbide sintered body using the discharge plasma sintering apparatus 100 will be described.

A preparation method of a tungsten carbide sintered body for a friction stir welding tool using pulsed current activation through the discharge plasma sintering apparatus according to the present invention includes a filling process, an installing process, a vacuum-making process, a molding process and a cooling process.

In the filling process, the tungsten carbide (WC) powder to be sintered is filled in the mold 200 made of the graphite material.

Only the WC powder is applied in the filling process.

Figure 2:
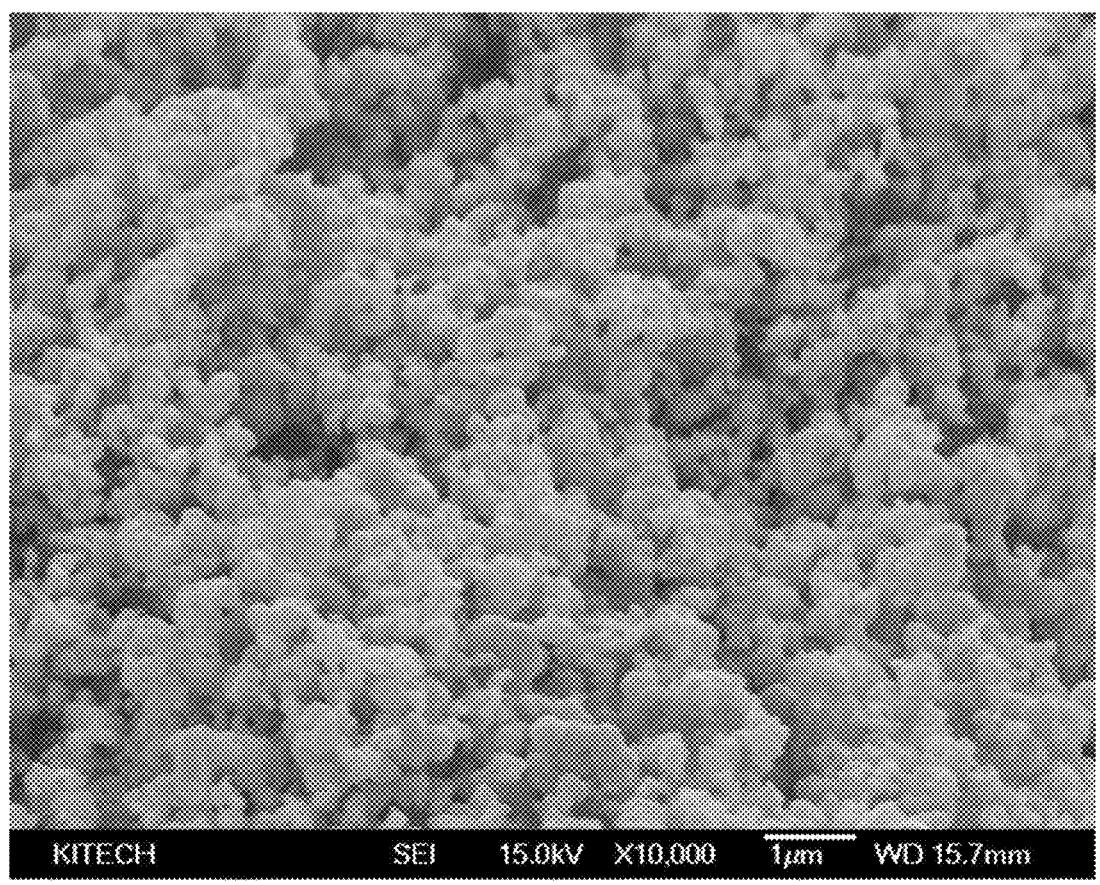
FIG. 2 is a photograph taken through a scanning electron microscope of tungsten carbide powder before a sintering process which is applied in the preparation method of the tungsten carbide sintered body for the friction stir welding tool in accordance with the present invention.

FIG. 2 is a photograph taken through a scanning electron microscope of the WC powder to be filled. The WC powder has a purity of 99.95% and a particle size of 0.5 μm. As shown in the photograph, each of particles has an almost spherical shape, but the particles are agglutinated with each other.

Figure 3:
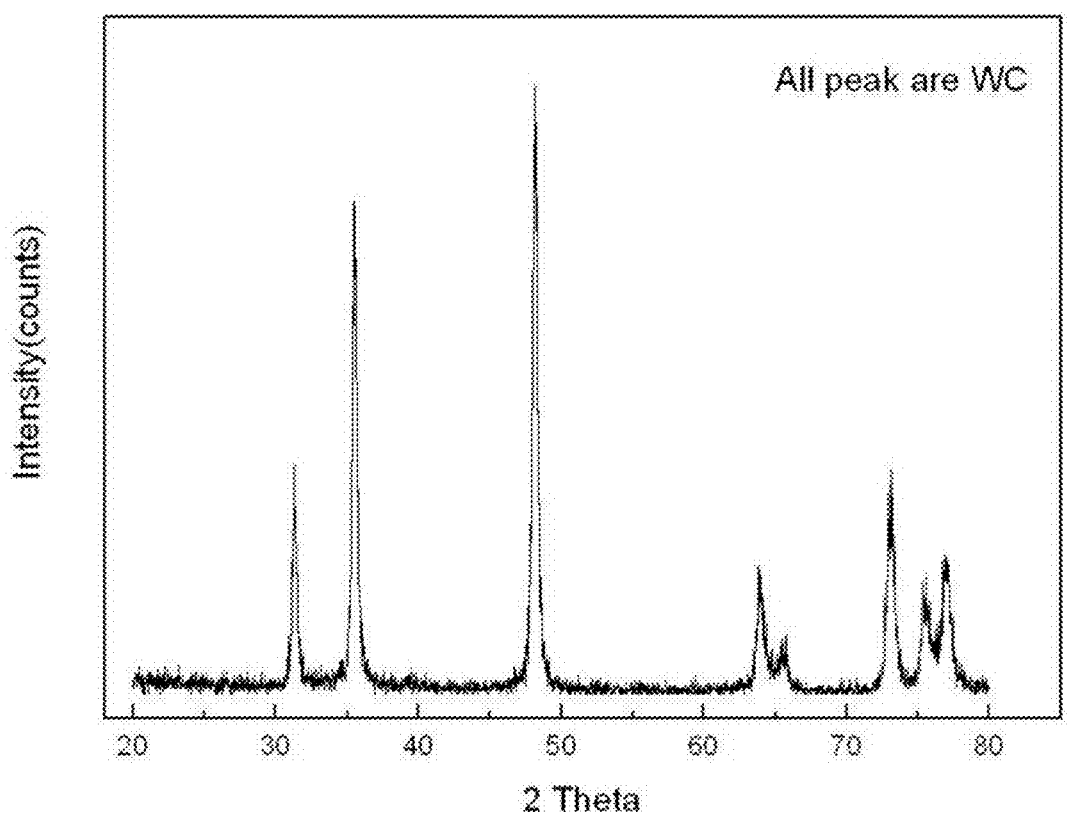
FIG. 3 is a graph illustrating a result of XRD component analysis of the tungsten carbide powder before the sintering process applied to FIG. 2.

Further, FIG. 3 shows a result of XRD component analysis of the WC powder applied to FIG. 2, wherein impurities such as $W_2C$ are not contained.

As described above, the WC powder to be sintered does not contain impurities other than a WC component.

In the filling process, firstly, the lower punch 216 is inserted into a lower portion of the mold 200, the WC powder is filled in the mold 200, the upper punch 215 is inserted into an upper portion of the mold 200, and then a pressure of 1400 to 1600 kgf is preliminarily pressurized for 5 to 15 minutes using a molding press so as to increase adhesion force between powder particles.

After the filling process, the installing process in which the mold 200 is installed in the chamber 110 of the discharge plasma sintering apparatus 100 is carried out. At this time, the above-mentioned upper and lower spacers 221, 222, 223, 231, 232 and 233 are installed between the upper and lower electrodes 211 and 212 of the mold 200.

The vacuum-making process is to make a vacuum inside the chamber 110. The inner air of the chamber 110 is discharged by the pump 150, and thus the vacuum is created in the chamber 110. At this time, an inside of the chamber may be vacuumized to 6 Pa to $1\times10^{-3}$ Pa. If the degree of the vacuum in the chamber 110 is too low, the WC powder may be contaminated and the inside of the chamber 110 may be oxidized by the impurities.

The molding process is to mold the WC powder 205 while applying the current to the WC powder 205. The pressurizer 160 is operated to maintain a pressure of 30 to 100 MPa, preferably 70 MPa, with respect to the WC powder 205 in the mold 200, and also the WC power in the mold 200 is heated according to a preset heating rate and heating pattern. At this time, a final target sintering temperature of the mold 200 may be set to 1410 to 2000° C. If the sintering temperature is less than to 1410° C., the molding may be not achieved, or a sintered body having a low density may be prepared. Further, if the sintering temperature is greater than to 2000° C., particles of the sintered body may suddenly grow, may be melted, and thus may have a bad influence on mechanical properties.

More specifically, in the molding process, the WC powder 205 in the mold 200 is primarily heated to a first target temperature of 550 to 650° C. at a heating rate of 60 to 150° C./min. The first target temperature may be 600° C.

When reaching the first target temperature, the first target temperature is isothermally maintained for 1 to 10 minutes.

Then, the WC powder 205 in the mold 200 is secondarily heated to a second target temperature of 900 to 1005° C. at a heating rate of 30 to 80° C./min. The second target temperature may be 1000° C.

When reaching the second target temperature, the second target temperature is isothermally maintained for 1 to 10 minutes.

And then, the WC powder 205 in the mold 200 is thirdly heated to a third target temperature of 1010 to 1105° C. at a heating rate of 10 to 80° C./min. The third target temperature may be 1100° C.

When reaching the third target temperature, the third target temperature is isothermally maintained for 1 to 10 minutes.

And then, the WC powder 205 in the mold 200 is fourthly heated to a fourth target temperature of 1110 to 1205° C. at a heating rate of 10 to 80° C./min. The fourth target temperature may be 1200° C.

When reaching the fourth target temperature, the fourth target temperature is isothermally maintained for 1 to 10 minutes.

And then, the WC powder 205 in the mold 200 is fifthly heated to a fifth target temperature of 1210 to 1305° C. at a heating rate of 10 to 80° C./min. The fifth target temperature may be 1300° C.

When reaching the fifth target temperature, the fifth target temperature is isothermally maintained for 1 to 10 minutes.

And then, the WC powder 205 in the mold 200 is sixthly heated to a sixth target temperature of 1310 to 1405° C. at a heating rate of 10 to 80° C./min. The sixth target temperature may be 1400° C.

When reaching the sixth target temperature, the sixth target temperature is isothermally maintained for 1 to 10 minutes.

And then, the WC powder 205 in the mold 200 is seventhly heated to a seventh target temperature of 1410 to 2000° C. at a heating rate of 10 to 80° C./min. The seventh target temperature may be 1500° C.

When reaching the seventh final target temperature, the seventh target temperature is isothermally maintained for 1 to 10 minutes.

The heating rate and the applied time in the isothermal state during the molding process are designated in Table 1.

TABLE 1

| Target temp. (° C.) | 0 | 550~650 | 900~1005 | 1010~1005 | 1100~1205 | 1210~1305 | 1310~1405 | 1410~1600 |
|---|---|---|---|---|---|---|---|---|
| Heating rate. (° C./min) | 0 | 60~150 | 30~80 | 10~80 | 10~80 | 10~80 | 10~80 | 10~80 |
| Maintaining (min) | 0 | 1~10 | 1~10 | 1~10 | 1~10 | 1~10 | 1~10 | 1~10 |

In the cooling process, after reaching the final target temperature and maintaining the isothermal state for the applied time, the inside of the chamber 110 is cooled, while a pressure applied to the WC powder 205 in the mold 200 is maintained.

Figure 4:
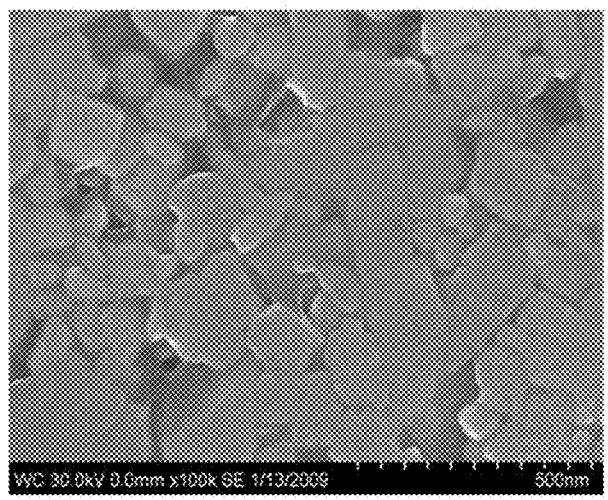
FIG. 4 is a photograph taken through a scanning electron microscope of a tungsten carbide sintered body which is prepared in accordance with the present invention and of which a surface is polished and then etched by a murakami etching process.

After the cooling process, a WC sintered body is separated from the mold 200. The WC sintered body prepared through the above-mentioned processes has a structure as illustrated in FIG. 4. In the preparation processes, a high current having a low voltage pulsed phase is introduced into a gap between the WC powder particles by the current applied through the upper and lower electrodes 211 and 212, and the sintered body is molded by thermal diffusion and electro-transport caused by high energy of discharge plasma momentarily generated by spark discharge, pressure and heat caused by electric resistance of the mold 200, and electric energy.

Also, the pulsed current activation is a direct heating manner in which the current directly flows to the WC as a test piece through the punches 215 and 216. Heat is generated in the test piece at the same time when the current is applied to the mold 200, and a temperature difference between an inside of the test piece and an outside thereof is relatively small, and also it is possible to minimize a thermal activation action generated in the sintering process, due to a relative low temperature and a short sintering time. Particularly, when sintering the WC powder, it is possible to achieve a high density of 99.5% or more and fine particles which are proper to a friction stir welding tool.

Further, according to the preparation method of the WC sintered body for the friction stir welding tool, it is possible to prepare a sintered body having a large surface area of a diameter of 50 to 150 mm and a thickness of 25 to 30 mm.

The WC sintered body can be sintered by only a single process without additional post-treatment processes and a sintering additive such as cobalt, can have the high relative density of 99.5% or more, and also can control the fine particles, compared with a conventional sintering method such as pressureless sintering, HP and HIP.

Furthermore, the preparation method according to the present invention can prepare the WC sintered body having a diameter and thickness which is 20 times greater than in the conventional sintering method (the pressureless sintering, the HP and the HIP), and also having uniform physical properties with high strength, high abrasion resistance and high density (high relative density of 99.5% or more), even though having a greater size.

This is because an isothermal state maintaining interval is provided after the heating process in order to reduce the temperature difference between the inside and the outside as well as the difference in the physical properties therebetween, and also to prepare the sintered body having the high density, even though it is faster than the conventional sintering method.

FIG. 4 shows a WC sintered body which is prepared in accordance with the present invention and of which a surface is polished and then etched by a murakami etching process. As shown in FIG. 4, the spherical WC may have a plate shape when sintering the WC.

The sintered bodies are prepared by the discharge plasma sintering apparatus before being molded to test pieces having a diameter of 65.5 mm and a thickness of 30 mm.

The friction stir welding tool before a test is prepared by machining the sintered test piece and installed at an FSW apparatus.

The WC tool is installed in the FSW apparatus and performs the friction stir welding test with respect to a SS400 (a tensile strength of 400 MPa class) steel plate. Stripe type grooves are deeply dug by frictional movement of the WC tool in a length direction of the SS400 (a tensile strength of 400 MPa class) steel plate at a central portion thereof are formed, and it can be understood from the grooves that the WC tool can be used for the friction stir welding process.

The SS400 (a tensile strength of 400 MPa class) steel plate and a currently available tungsten carbide-cobalt tool before and after are installed in the FSW apparatus and performs the friction stir welding test. According to a result of the test which is performed at a lower level than the test using the WC tool of the present invention, it could be understood that the test with respect to the SS400 (a tensile strength of 400 MPa class) steel plate was not performed well, and the tungsten carbide-cobalt tool was broken at the same time when the frictional movement test was begun.

Compared to the currently available tungsten carbide-cobalt tool, the conventional tool is broken at the same time when the test is begun, or worn out, but in the tool of the sintered body having the relative density of 99.8% or more prepared according to the present invention, a probe or a shoulder portion of the tool is not broken or worn out in the friction stir welding test of 50 m or more.

Figure 5:
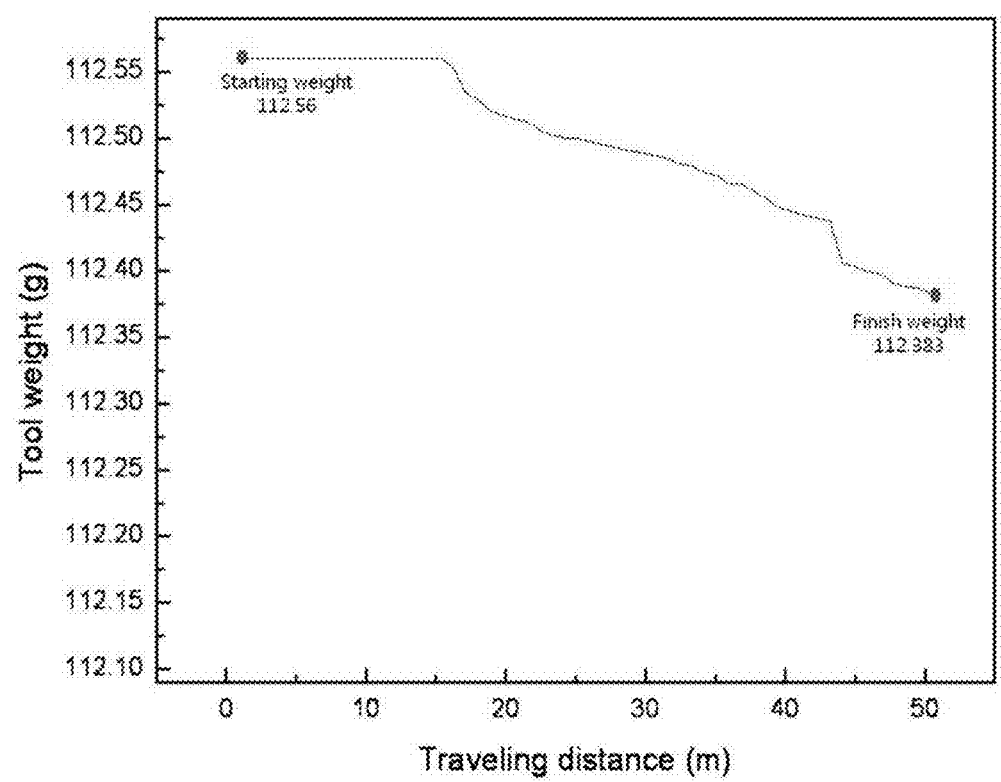
FIG. 5 is graph illustrating a change in a weight of the tungsten carbide tool while performing the test process of 50 m or more.

FIG. 5 is graph illustrating a change in a weight of the WC tool while performing the friction stir welding test. After the friction stir welding test of 50 m or more, the change of the weight of the WC tool is 0.177 g, and thus it can be understood that the WC tool is hardly worn out.

Figure 6:
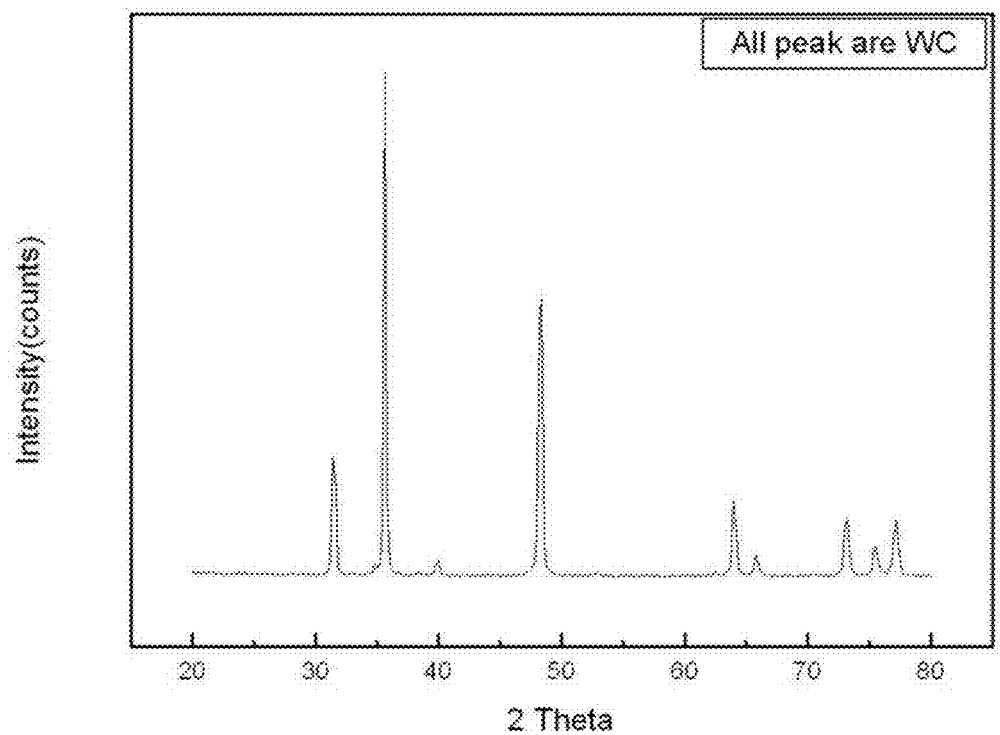
FIG. 6 is a graph illustrating a result of XRD component analysis with respect to the sintered body.

Meanwhile, FIG. 6 is a graph illustrating a result of XRD component analysis with respect to the sintered body prepared by the preparation method of the present invention. As shown in FIG. 6, impurities other than a WC component are not observed, and $W_2C$ are not absolutely found.

Further, the sintered body prepared by the preparation method of the present invention and having a thickness of 30 mm is cut at positions corresponding to an upper surface and 25 mm, 15 mm and 5 mm from a bottom surface, and then hardness and fracture toughness thereof are measured, and a result thereof is indicated in Table 2.

TABLE 2

| Cut position | Relative density (%) | Hardness (kg/mm$^2$) Hv30 | Fracture toughness (Mpa · m$^{1/2}$) |
|---|---|---|---|
| Surface (30 mm) | 99.8 | 2484.9 | 4.30 |
| 25 mm | 99.8 | 2474.6 | 4.96 |

TABLE 2-continued

| Cut position | Relative density (%) | Hardness (kg/mm²) Hv30 | Fracture toughness (Mpa · m^(1/2)) |
|---|---|---|---|
| 15 mm | 99.8 | 2686.4 | 5.29 |
| 5 mm | 99.8 | 2573.4 | 4.82 |

Meanwhile, unlike the multi-stage heating pattern indicated in Table 1, when the sintered body is prepared, while being continuously heated to the final target temperature at a preset heating rate of 30 to 70° C. per one minute, the sintered body has a relative density of about 94%, a hardness of 2200 kg/mm² and a fracture toughness of 6 Mpa·m^(1/2). From the result, when the tool is prepared from a large-sized sintered body having a diameter of 60 mm or more and a thickness of 30 mm or more, the multi-stage heating pattern indicated in Table 1 may be applied.

Although an exemplary embodiment of the present invention has been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A preparation method of a tungsten carbide sintered body for a friction stir welding tool, comprising:
   filling tungsten carbide (WC) powder in a mold made of a graphite material;
   installing the mold filled with the WC powder in a chamber of a discharge plasma sintering apparatus;
   making a vacuum inside the chamber;
   molding the WC powder in the mold while maintaining a constant pressure inside the mold;
   cooling the inside of the chamber while maintaining the pressure applied in the mold after the molding; and
   separating the tungsten carbide sintered body from the mold after the cooling,
   wherein the molding comprises:
   primarily heating the WC powder in the mold to a first target temperature at a heating rate of 60 to 150° C./min;
   maintaining the first target temperature for 1 to 10 minutes;
   secondarily heating the WC powder in the mold to a second target temperature at a heating rate of 30 to 80° C./min;
   maintaining the second target temperature for 1 to 10 minutes;
   thirdly heating the WC powder in the mold to a third target temperature at a heating rate of 10 to 80° C./min;
   maintaining the third target temperature for 1 to 10 minutes;
   fourthly heating the WC powder in the mold to a fourth target temperature at a heating rate of 10 to 80° C./min;
   maintaining the fourth target temperature for 1 to 10 minutes;
   fifthly heating the WC powder in the mold to a fifth target temperature at a heating rate of 10 to 80° C./min;
   maintaining the fifth target temperature for 1 to 10 minutes;
   sixthly heating the WC powder in the mold to a sixth target temperature at a heating rate of 10 to 80° C./min;
   maintaining the sixth target temperature for 1 to 10 minutes;
   seventhly heating the WC powder in the mold to a seventh final target temperature at a heating rate of 10 to 80° C./min; and
   maintaining the seventh final target temperature for 1 to 10 minutes,
   wherein the first target temperature is 550 to 650° C., the second target temperature is 900 to 1005° C., the third target temperature is 1010 to 1105° C., the fourth target temperature is 1110 to 1205° C., the fifth target temperature is 1210 to 1305° C., the sixth target temperature is 1310 to 1405° C., and the seventh final target temperature is 1410 to 2000° C.

2. The preparation method of claim 1, wherein the WC powder in the filling has a particle size of 10 to 100 μm, and further comprising preliminarily pressurizing the WC powder at a pressure of 1400 to 1600 kgf/cm² and maintaining the pressure for 5 to 15 minutes, after the filling of the WC powder in the mold.

3. The preparation method of claim 2, wherein, in the installing, a plurality of upper spacers made of a graphite material, of which each diameter is gradually reduced toward an upper punch, is provided between an upper electrode for applying an electric field into the mold and the upper punch entering into the mold from an upper side of the mold, and a plurality of lower spacers made of a graphite material, of which each diameter is gradually reduced toward a lower punch, is provided between a lower electrode in the chamber and the lower punch entering into the mold from a lower side of the mold,
   the upper spacers has a first upper spacer, a second upper spacer and a third upper spacer which are disposed in a circular shape in a direction from the upper electrode to the upper punch,
   the lower spacers has a first lower spacer, a second lower spacer and a third lower spacer which are disposed in a circular shape in a direction from the lower electrode to the lower punch, and
   the first upper spacer and the first lower spacer have a diameter of 350 mm and a thickness of 30 mm, the second upper spacer and the second lower spacer have a diameter of 300 mm and a thickness of 60 mm, and the third upper spacer and the third lower spacer have a diameter of 100 to 200 mm and a thickness of 15 to 30 mm.

4. The preparation method of claim 3, wherein, in the making of the vacuum, the inside of the chamber is vacuumized to 6 Pa to 1×10⁻³ Pa in order to restrict contamination due to oxidation of the WC powder and impurities in the chamber, and
   the molding maintains the WC powder filled in the mold at a pressure of 30 to 100 MPa.

* * * * *